June 19, 1956  F. SACO ET AL  2,751,164
REWIND ROLL SUSPENSION AND BEARING
Filed Feb. 2, 1954  4 Sheets-Sheet 2

FIG. 2.

INVENTORS
Leonard Rockstrom
and
Felix Saco
BY Thomas W. Y. Clark
ATTORNEY

June 19, 1956
F. SACO ET AL
2,751,164
REWIND ROLL SUSPENSION AND BEARING
Filed Feb. 2, 1954
4 Sheets-Sheet 3
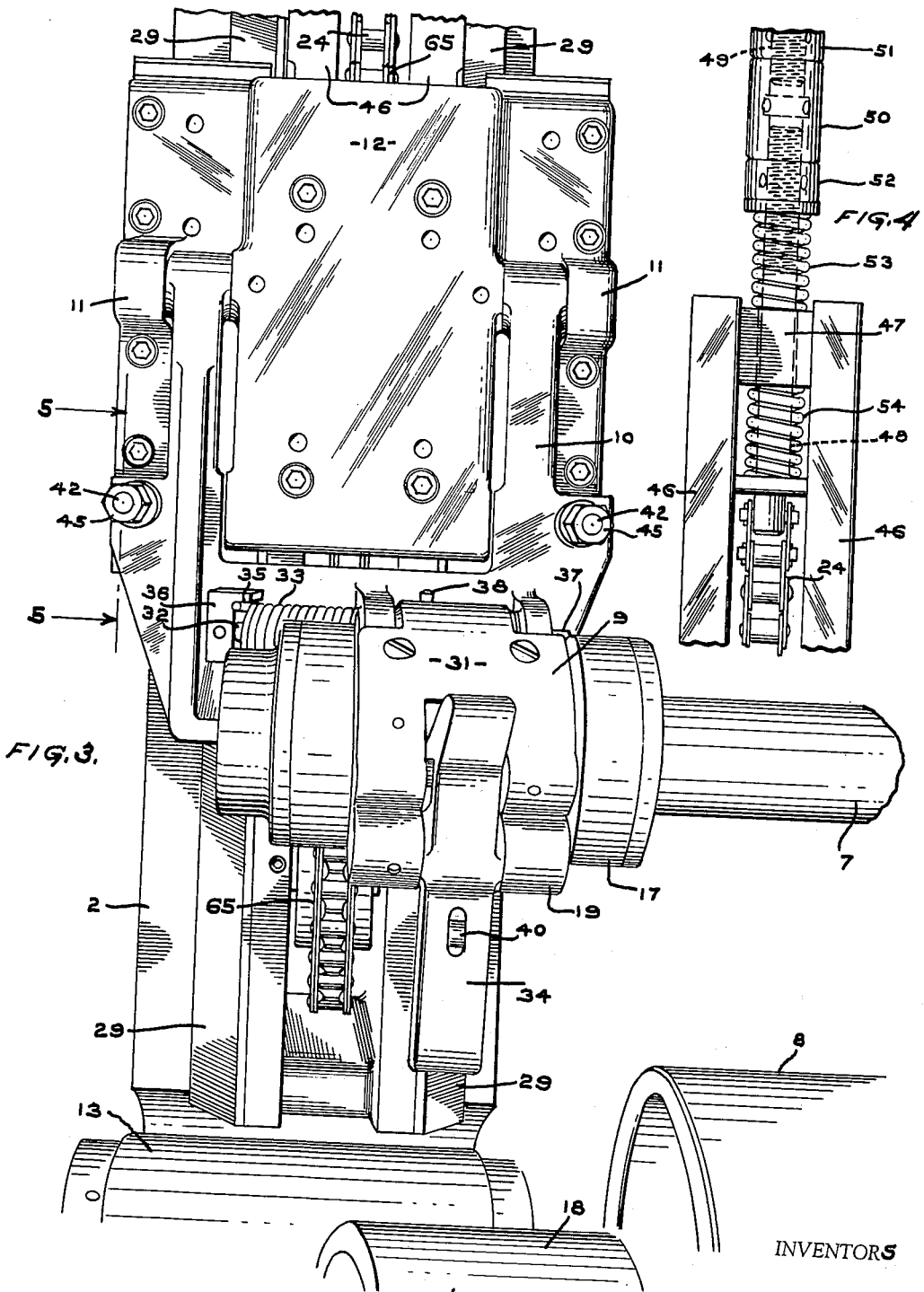
INVENTORS
Leonard Rockstrom
and Felix Saco
BY
ATTORNEY

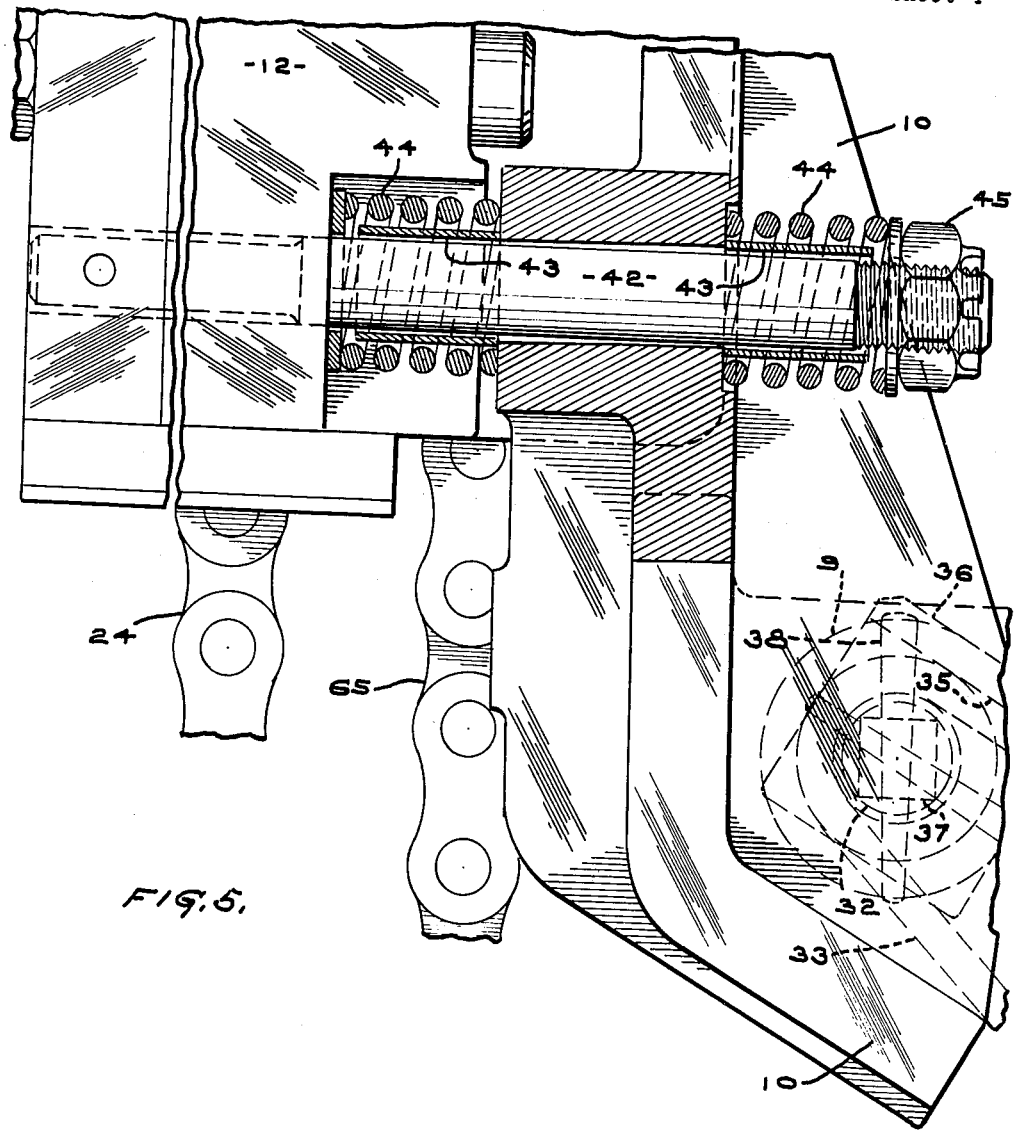

United States Patent Office 2,751,164
Patented June 19, 1956

2,751,164
REWIND ROLL SUSPENSION AND BEARING

Felix Saco, West Islip, and Leonard Rockstrom, Manhasset, N. Y., assignors to Cameron Machine Company, Brooklyn, N. Y., a corporation of New York Application February 2, 1954, Serial No. 407,631

11 Claims. (Cl. 242—66)

This invention relates to the rewind roll suspension and bearing of a rewind machine such as that shown in the application Serial No. 390,002 filed November 3, 1953, to which reference may be made for a description of elements shown but not described herein.

Paper from a mill roll is rewound in the rewind machine after slitting in that machine to narrower widths. The paper is wound on a rewind shaft which is initially placed between two closely spaced parallel winding rolls and which is rotatably supported in bearings at its end. The paper is rolled around the rewind shaft by the rotation of the winding rolls in the same direction as the paper on the rewind shaft rests in the valley between the rotating winding rolls.

The rewind shaft is initially placed in the clamps or bearings which are preferably suspended from brackets supported by carriages carried by endless chains at each side of the machine and the carriages are guided on uprights at the sides of the machine. The bearings are initially lowered when the rewind operation begins and they automatically rise with the increase in the size of the rewound roll. In order to counterbalance the weight of the carriages and the rewind shaft the invention contemplates placing counterweights on supports moving in guides and supported by this same endless chain that supports the rewind bearing carriages. These chains pass around sprockets in the upper and lower parts of the machine to give the chains two upright paths with the carriages for the bearings carried during the passage of the chain in one upright path and the counterweights in the other upright path. Fluid pressure means are provided to raise and lower the rewind shaft and its bearings and through means of these fluid pressure means pressure can be exerted upon the rewind shaft in either an up or a down direction should that be desired. A synchronizing shaft is provided between the chains at each side of the machine to assure their synchronous movement. Standby manual means are also provided to raise and lower the rewind bearing carriages and shaft should that be desirable when the fluid pressure is not available.

At times it happens that a bent rewind shaft is placed in the machine and should that occur the rewound paper roll will vibrate both horizontally and vertically in respect to the machine and its shaft bearing supports. Vertically, resiliency has heretofore been imparted to the rewind bearings by placing springs both above and below the connection of the bearing brackets to the endless means. In addition to this vertical resiliency, the instant invention contemplates the placing of springs on both sides of pivoted bearing brackets so that horizontal vibrations of the rewind shaft will not be imparted directly to the machine, but will be absorbed by the springs supporting the bearing brackets. These springs, both permitting vertical as well as horizontal vibration are sufficiently strong to tend to dampen that vibration so that as the size of the roll increases all vibration will be substantially eliminated.

Other objects and advantages of the invention will be apparent from the following description and the accompanying drawings forming a part hereof and in which:

Figure 2 is a vertical cross-sectional view looking to the left in Figure 1.

Figure 3 is a front perspective view of the rewind shaft bearing and carriage on the left hand side of the machine.

Figure 4 is a fragmentary elevational view showing the connection of the carriage to its supporting chain.

Figure 5 is an enlarged fragmentary sectional view on line 5—5 of Figure 3.

In the drawings similar numerals refer to similar parts throughout the several views:

Figure 1:
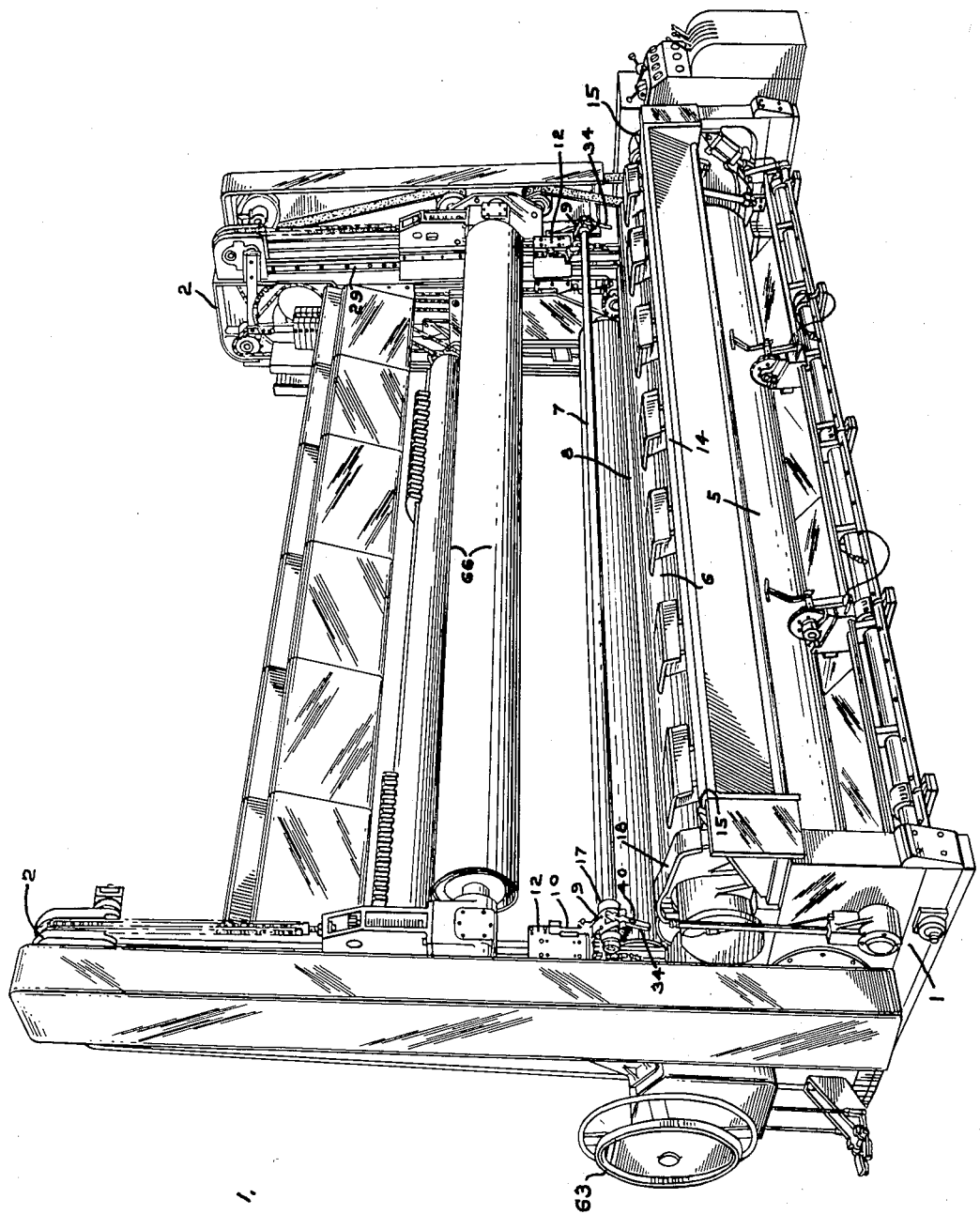
Figure 1 is a front perspective view of the rewind machine showing the rewind shaft and its bearings and carriages embodied in this invention.

The winding machine has a base 1 and uprights 2 and the running web 3 enters the machine from the rear, passing over compensating roll 4, under backing roll 5 and then over the front winding roll 6 to the rewind shaft 7 in the valley between the front winding roll 6 and the rear winding roll 8, at the beginning of the operation, the rewind shaft 7 being held by rewind shaft bearing 9 in bracket 10 pivoted at 11 in carriages 12. The rear winding roll 8 is mounted in bearings 13 and the rewind shaft 7 is rolled to the valley between the winding rolls from the ready trough 14 by means of the pick-up and lowering arms 15 and 16 respectively. The rewind shaft has a spool shaped bearing 17 at one end, the shoulders or flanges at each end of which pass down over the sides of the guide 18 to longitudinally guide the rewind shaft so that the spool shaped end falls readily into the bottom portion 19 of the bearing 9.

Reference may be had to the above noted application for a detailed description of parts not herein specifically described and also to the application on Rewind Shaft Injector filed substantially concurrently herewith by Herbert Goddard and Leonard Rockstrom for a detailed description of the rewind shaft loader.

In the sides 2 of the machine are idler sprockets 20, 21, 22 and 23 around each set of which pass endless chains 24. Idlers 21 on each side of the machine are connected by synchronizing shaft 25 extending the width of the machine. On this shaft are other sprockets 26 at each side of the machine and therebeneath likewise on the sides of the machine are idlers 27 which are mounted in slack take-up members 28.

On both sides of the front of the sides 2 of the machine are ways 29 on which the carriages 12 ride. These carriages are generally U-shaped with the U fitting around the front of the sides 2 of the machine and each side of each carriage has a clamp 30 extending around the ways 29 to hold the carriages firmly and yet permit their sliding movement.

The brackets 10 pivoted at 11 in the carriages 12 have integral therewith the lower portion 19 of the bearings 9 and have complementary bearing covers 31 mounted on rod 32 in the brackets and the pivot rod 32 has a spring 33 thereon sprung to open the cover 31 upon the release of latch 34 from the cover. One end of the spring rests against a shoulder 35 on square member 36 pinned to the end of the rod. The other end rests against the face of the bracket. After winding the spring by square head 37, pin 38 is passed through cover 31 and rod 32, member 36 turning freely with the rod. The latch 34 has a spring 39 on rod 40 passing through boss 41 on the bottom of bracket 10, to maintain the latch in latched position.

The bearing bracket 10 pivoting at 11 has passing horizontally through it a rod 42 held rigidly at one end in carriage 12. This rod 42 has thereon collars 43 and springs 44 on both sides of the bracket and there are similar rods 42 on both sides of the U-shape brackets 10 as shown in Figure 3. Nuts 45 on the free ends of rods 42 tighten both springs on each rod and preferably collars 43 are of a length to allow only slight horizontal movement to brackets 10, that movement always being under control of the springs 44.

The carriages 12 have extensions 46 at their tops through the inset cross member 47 on which pass rods 48, the rods 48 being connected at their lower ends to chains 24. At the upper end, chains 24 have bolts 49 thereon, and bolts 49 and rods 48 are connected by turnbuckles 50 to tighten the chains. Lock nuts 51 and 52 hold the turnbuckle from turning. Rods 48 have thereon above and below members 47, springs 53 and 54. By means of these springs 53 and 54 vertical resilience is allowed to the carriages 12 on their carrying chains 24.

Each of the sides 2 likewise has guides 55 on the inside walls thereof between which pass the other upright runs of chains 24 between sprockets 21 and 22. These guides present a U-shaped cross-section at their outer sides and in them are rollers 56 mounted on support arms 57 to which are attached supports 58 for counterweights 59 which may be attached to the supports. Alternate counterweights may be attached to give the counterbalancing effect to the rewind shaft carriages and bearings that may be desired.

Around sprockets 26 and idlers 27 are passed drive chains 60. These drive chains connect to hydraulic cylinders 61 attached to the sides 2 of the machine at one end and to pistons 62 operated by the cylinders, the cylinders having pressure admitted thereto at each end to raise or lower the bearing carriages. Because of the difference in size of sprockets 21 and 26, it will be apparent that a relatively small movement of the pistons 62 is required to move the carriages 12 a much greater amount.

Should it be desired to move the bearing carriages by hand, a suitable wheel 63 is provided which through suitable gearing not forming a part of this invention drives chain 64 connected to sprocket 22.

In Figure 3 one of the chains 65 supporting the riding roll 66, is seen as passing through the rewind roll carriage 12.

From the above detailed description it will be apparent that the counter-balanced bearing carriages are always under complete control of the operator either through the hydraulic drive means or the hand operating means and that vertical as well as horizontal resilience is given to the rewind shaft bearing, but this resilience is always closely under control to effect expeditious and even winding of the rewound roll. It will also be apparent that the vertical resilience allowed to the rewind shaft will permit temporary tilting of that shaft should the rewind roll wind unevenly but the springs on both sides of each carriage extension will tend to restore the rewind shaft to its parallel position in relation to the winding rolls. It will also be apparent that many modifications may be made in the construction of the elements of the machine without departing from the invention.

What is claimed as new and is desired to be secured by Letters Patent is:

1. A web roll rewind machine having therein a pair of spaced uprights, a pair of spaced parallel rewind roll supporting rolls supported in and between the uprights, a rewind shaft bearing carriage sliding on each said upright having a bearing therein for one end of a rewind shaft, the combination therewith, endless means supporting each carriage, vertically spaced sprockets carried by said uprights supporting each said endless means to provide two upright runs therefor, counterweights for said carriages supported by said endless means, one said run having therein the bearing carriages and the other the counterweights to control the movement of the carriages and weights from both above and below.

2. The machine of claim 1 including fluid pressure means connected to one said sprocket on each side of the machine to supplement or counteract the weight of the counterweight with any selected pressure.

3. The machine of claim 1 including drive means for each said endless means and a shaft on which a pair of said sprockets, one supporting each endless means, are fixedly mounted to synchronize movements of the two endless means.

4. The machine of claim 1 including an endless driving means, a pair of sprockets supporting the driving means, one sprocket being connected to drive one of the said carriage supporting endless means sprockets and a fluid actuated piston and cylinder connected to the driving endless means to operate the same upon the admission of fluid to the cylinder, and means to connect the two said carriage supporting endless means to move them together.

5. In a web roll rewind machine having a pair of spaced uprights, a pair of spaced parallel rewind roll supporting rolls supported in and between the uprights, a rewind shaft bearing carriage sliding on each said upright having a bearing therein for one end of a rewind shaft, an endless means connected to and supporting each carriage, vertically spaced sprockets carried by said uprights supporting each endless means to provide an upright run therefor having therein one of the carriages to support the carriages both above and below, an improved drive for said carriage comprising double acting fluid actuated piston and cylinder drivingly connected to each endless means to either raise or lower the carriage therein by force applied through said endless means and a shaft extending between and fixedly connected to a pair of corresponding sprockets supporting each said endless means to maintain movements of the two endless means in unison.

6. In a web roll rewind machine having a pair of spaced uprights, a pair of spaced parallel rewind roll supporting rolls supported in and between the uprights, a rewind shaft bearing carriage sliding on each said upright having a bearing therein for one end of a rewind shaft, an endless means connected to and supporting each carriage, vertically spaced sprockets carried by said uprights supporting each endless means to provide an upright run therefor having therein one of the carriages to support the carriages both above and below, an improved drive for said carriages comprising a pair of driving endless means, a pair of sprockets supporting each driving endless means, one sprocket supporting each driving endless means and being connected to drive one of said carriage supporting endless means, a double acting fluid actuated piston and cylinder connected to each endless means to operate the same upon the admission of fluid to the cylinder to either raise or lower the carriage therein by force applied through said endless means, and means connecting and extending between the two carriage supporting endless means to coordinate their movements with each other.

7. In a web roll rewind machine having a pair of spaced uprights, a pair of spaced parallel rewind roll supporting rolls supported in and between the uprights, a rewind shaft bearing carriage sliding on each said upright having a bearing therein for one end of a rewind shaft, an improved mounting for said carriages comprising, an endless means connected to and supporting each carriage, vertically spaced sprockets carried by said uprights supporting each endless means to provide an upright run therefor having therein one of the carriages to support the carriages both above and below, the bearings in the carriages supporting a rewind shaft above and parallel to and between the supporting rolls, connections for said bearings to attach them to the carriages, resilient means in each said connection to resiliently urge a rewind shaft in the bearing into vertical parallelism between the supporting rolls.

8. In a web roll rewind machine having a pair of spaced uprights, a pair of spaced parallel rewind roll supporting rolls supported in and between the uprights, a rewind shaft bearing carriage sliding on each said upright having a bearing therein for one end of a rewind shaft, an improved mounting for said carriages comprising, an endless means connected to and supporting each carriage, vertically spaced sprockets carried by said uprights supporting each endless means to provide two upright runs therefor, counterweights for said carriages supported by said endless means, one said run having therein the bearing carriages and the other the counterweights to control the movement of the carriages and weights from both above and below, connections for said bearings to attach them to the endless means and resilient means in each said connection to resiliently urge a rewind shaft in the bearings into vertical parallelism with the supporting rolls.

9. In a web roll rewind machine having a pair of spaced uprights, a pair of spaced parallel rewind roll supporting rolls supported in and between the uprights, a rewind shaft bearing carriage sliding on each said upright having a bearing therein for one end of a rewind shaft, an improved mounting for said carriages comprising, an endless means connected to and supporting each carriage, vertically spaced sprockets carried by said uprights supporting each endless means to provide two upright runs therefor, counterweights for said carriages supported by said endless means, one said run having therein the bearing carriages and the other the counterweights to control the movement of the carriages and weights from both above and below, the bearings in the carriages supporting a rewind shaft above and parallel to and between the supporting rolls, connections for said bearings to attach them to the endless means and resilient means in each said connection to resiliently urge a rewind shaft in the bearings into horizontal parallelism between and vertical parallelism with the supporting rolls.

10. In a web roll rewind machine having a pair of spaced uprights, a pair of spaced parallel rewind roll supporting rolls supported in and between the uprights, a rewind shaft bearing carriage sliding on each said upright having a bearing therein for one end of a rewind shaft, an improved mounting for said carriages comprising, an endless means connected to and supporting each carriage, vertically spaced sprockets carried by said uprights supporting each endless means to provide two upright runs therefor, counterweights for said carriages supported by said endless means, one said run having therein the bearing carriages and the other the counterweights to control the movement of the carriages and weights from both above and below, a double acting fluid actuated piston and cylinder drivingly connected to each endless means to either raise or lower the carriage therein by force applied through said endless means and a shaft extending between and fixedly connected to a pair of corresponding sprockets supporting each said endless means to maintain movement of the two endless means in unison.

11. In a web roll rewind machine having a pair of spaced uprights, a pair of spaced parallel rewind roll supporting rolls supported in and between the uprights, a rewind shaft bearing carriage sliding on each said upright having a bearing therein for one end of a rewind shaft, an improved mounting for said carriages comprising, an endless means connected to and supporting each carriage, vertically spaced sprockets carried by said uprights supporting each endless means to provide two upright runs therefor, counterweights for said carriages supported by said endless means, one said run having therein the bearing carriages and the other the counterweights to control the movement of the carriages and weights from both above and below, a double acting fluid actuated piston and cylinder drivingly connected to each endless means to either raise or lower the carriage therein by force applied through said endless means and a shaft extending between and fixedly connected to a pair of corresponding sprockets supporting each said endless means to maintain movement of the two endless means in unison, connections for said bearings to attach them to the endless means, and resilient means in each said connection to resiliently urge a rewind shaft in the bearings from both ends of the shaft simultaneously into vertical parallelism with the supporting rolls.

References Cited in the file of this patent
UNITED STATES PATENTS

| | | |
|---|---|---|
| 1,342,532 | Coppage | June 8, 1920 |
| 1,488,126 | Langston et al. | Mar. 25, 1924 |
| 1,707,047 | Cameron | Mar. 26, 1929 |
| 2,609,157 | Asmussen et al. | Sept. 2, 1952 |

FOREIGN PATENTS

| | | |
|---|---|---|
| 479,857 | France | Feb. 21, 1916 |